United States Patent
Fukutomi et al.

(10) Patent No.: US 10,107,243 B2
(45) Date of Patent: Oct. 23, 2018

(54) FUEL INJECTION VALVE

(71) Applicant: Mitsubishi Electric Corporation, Tokyo (JP)

(72) Inventors: Norihisa Fukutomi, Tokyo (JP); Akio Shingu, Tokyo (JP); Kyosuke Watanabe, Tokyo (JP); Tsuyoshi Munezane, Tokyo (JP); Manabu Hirai, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 6 days.

(21) Appl. No.: 15/501,212

(22) PCT Filed: Oct. 28, 2014

(86) PCT No.: PCT/JP2014/078546
§ 371 (c)(1),
(2) Date: Feb. 2, 2017

(87) PCT Pub. No.: WO2016/067354
PCT Pub. Date: May 6, 2016

(65) Prior Publication Data
US 2017/0218899 A1     Aug. 3, 2017

(51) Int. Cl.
*F02M 51/00* (2006.01)
*F02M 51/06* (2006.01)
*F02M 61/20* (2006.01)

(52) U.S. Cl.
CPC ...... *F02M 51/0614* (2013.01); *F02M 51/061* (2013.01); *F02M 61/20* (2013.01); *Y10S 239/90* (2013.01)

(58) Field of Classification Search
CPC .. F02M 51/0614; F02M 61/20; F02M 51/061; Y10S 239/90
(Continued)

(56) References Cited

U.S. PATENT DOCUMENTS 5,769,391 A     6/1998  Noller et al.
6,409,102 B1 *  6/2002  Luttrell .............. F02M 51/0614
                                                    239/585.1
(Continued)

FOREIGN PATENT DOCUMENTS

CN          1196855 C      4/2005
CN        104107980 A     10/2014
(Continued)

OTHER PUBLICATIONS

International Search Report of PCT/JP2014/078546 dated Jan. 6, 2015.
(Continued)

*Primary Examiner* — Steven J Ganey
(74) *Attorney, Agent, or Firm* — Sughrue Mion, PLLC; Richard C. Turner (57) ABSTRACT

A fuel injection valve includes: a holder which accommodates a valve body, has a surface magnetically facing the outer periphery of an armature, and is joined to a core; a housing which is press-fitted onto the outer periphery of the holder and accommodates a coil; and a cap which covers the fuel upstream side of the coil in a lid shape and is press-fitted onto the outer periphery of the core. The lower surface of the cap is brought into contact with the upper end surface of the housing in a radially slidable state and then an outer peripheral portion of a contact surface between the cap and the housing is joined by laser welding.

8 Claims, 5 Drawing Sheets

(58) Field of Classification Search
USPC .............. 239/584, 585.1, 585.4, 900, 533.12
See application file for complete search history.

(56) References Cited

U.S. PATENT DOCUMENTS

| | | | |
|---|---|---|---|
| 6,712,289 | B1 | 3/2004 | Ruehle et al. |
| 7,832,656 | B2 * | 11/2010 | Matteucci .......... F02M 51/0603 |
| | | | 239/584 |
| 2003/0168532 | A1 | 9/2003 | Maier |
| 2010/0263629 | A1 | 10/2010 | Kondo et al. |

FOREIGN PATENT DOCUMENTS

| | | |
|---|---|---|
| EP | 2 570 648 A1 | 3/2013 |
| JP | 4130771 B2 | 8/2008 |
| JP | 2009-243466 A | 10/2009 |
| JP | 2010-249061 A | 11/2010 |
| JP | 2011-241701 A | 12/2011 |

OTHER PUBLICATIONS

Communication dated Jun. 27, 2017 from the Japanese Patent Office in counterpart application No. 2016-556075.

\* cited by examiner

PART A

FIG. 10

FUEL INJECTION VALVE

CROSS REFERENCE TO RELATED APPLICATIONS

This application is a National Stage of International Application No. PCT/JP2014/078546 filed Oct. 28, 2014, the contents of which are incorporated herein by reference in its entirety.

TECHNICAL FIELD

The present invention relates to an electromagnetic fuel injection valve mainly used for a fuel supply system of an internal combustion engine.

BACKGROUND ART

Figure 7:
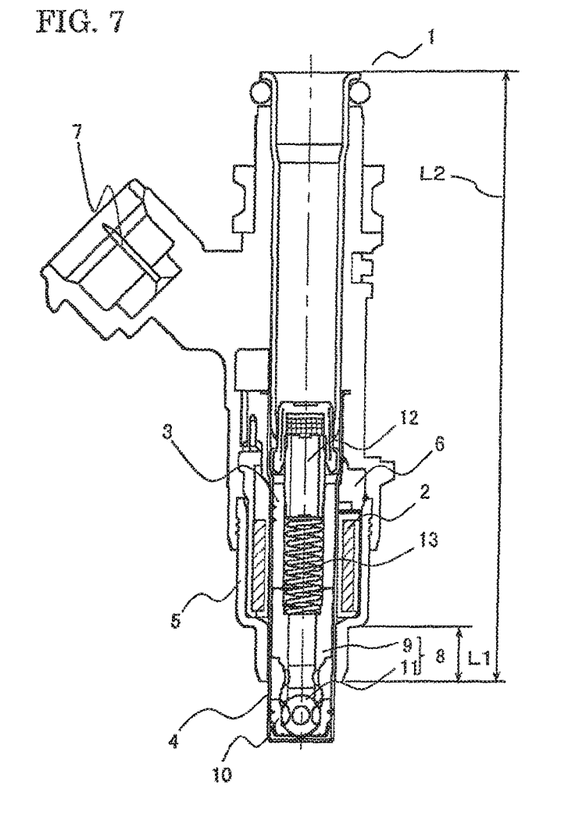
FIG. 7 is a sectional view showing an example of a conventional fuel injection valve.

FIG. 7 is a sectional view showing an example of a conventional fuel injection valve.
As shown in FIG. 7, a conventional fuel injection valve 1 is configured such that a valve body 8 serving as a movable element that forms a valve mechanism is composed of an armature 9 and a valve portion 11; the valve body 8 is pressed to a valve seat 10 by a spring 13 when the valve is closed; a magnetic field generated by a coil 2 generates magnetic suction force that suctions the armature 9 to a core 3 side when an electrode terminal 7 is energized; and thus, the valve body 8 is moved to the core 3 side to generate a gap between the valve portion 11 and the valve seat 10, that is, the valve is opened and fuel flows.

Furthermore, in the conventional fuel injection valve 1 shown in FIG. 7, a magnetic path include: the core 3, the armature 9, a holder 4, a housing 5, and a cap 6. At this time, the coil 2 is accommodated in the housing 5 and the cap 6 is welded and fixed to the housing 5 in the form covering the coil 2 in a lid shape. The cap 6 is press-fitted onto the holder 4 and then welded and fixed thereto, and comes into contact with the housing 5 at a tapered surface to stably secure a contact area with the housing 5. At this time, the housing 5 and the holder 4 are set to have a gap therebetween from a standpoint of absorbing axial deviation; and in order to compensate magnetic loss due to the gap, the configuration is made such that the facing length Li of the holder 4 and the housing 5 is lengthened. (See Patent Document 1.)

Figure 8:
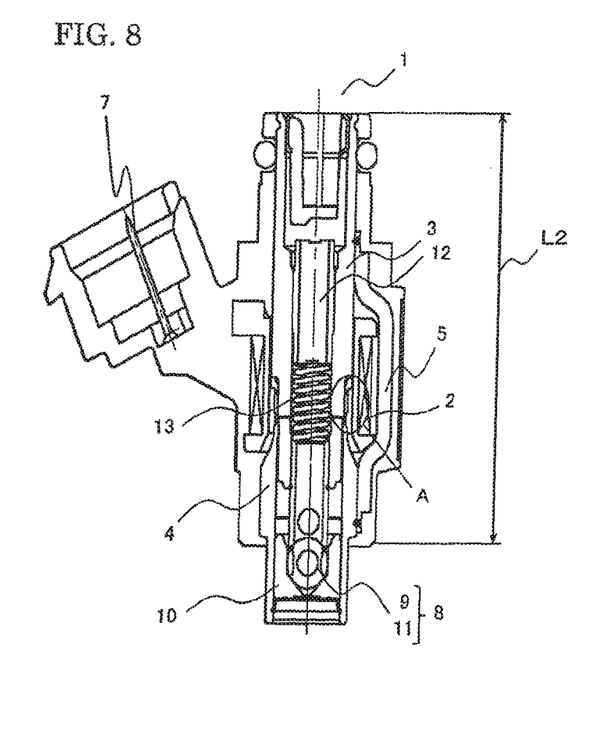
FIG. 8 is a sectional view showing other example of the conventional fuel injection valve.
Figure 9:
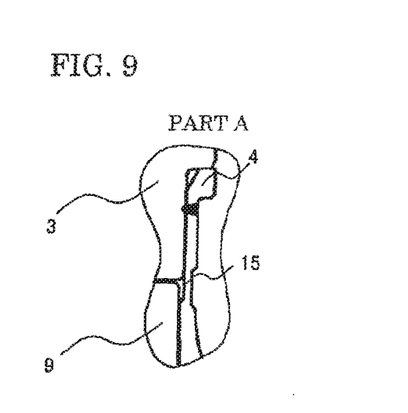
FIG. 9 is an enlarged view of a part A of FIG. 8.

In addition, FIG. 8 shows other conventional example; and in a conventional fuel injection valve 1 shown in FIG. 8, a core 3 and a holder 4 are integrated. Then, as shown in FIG. 9 in which a part A of FIG. 8 is enlarged and is shown, a thinned portion 15 is provided at a part of the holder 4 and magnetic leakage, which does not pass through a suction facing surface but passes through this part of the holder 4, is limited to improve magnetic efficiency than that of the fuel injection valve of FIG. 7, (See Patent Document 2.)

PRIOR ART DOCUMENT

Patent Document

Patent Document 1: JP4130771,B
Patent Document 2: U.S. Pat. No. 5,769,391,A

SUMMARY OF THE INVENTION

Problems to be Solved by the Invention

In recent years, fuel injection (FI) has been progressing even in a small displacement two-wheeled internal combustion engine and the fuel injection valve has been widely adopted; and thus, there has been required an improvement in performance of engine layout such as minimization of a mounting length L2 and/or an outer diameter for the conventional fuel injection valves shown in FIG. 7 and FIG. 8. Besides, injection performance equivalent to that of the conventional fuel injection valve has to be provided.

In the fuel injection valve 1 of FIG. 7, a problem exists in that since the axial facing length L1 of the holder 4 and the housing 5 has to be lengthened by the aforementioned reasons, the mounting length L2 is relatively lengthened. Furthermore, in the fuel injection valve 1 of FIG. a problem exists in that since the aforementioned thinned portion is not provided on the holder 4, the magnetic efficiency is bad as compared to the fuel injection valve of FIG. 8.

Figure 10:
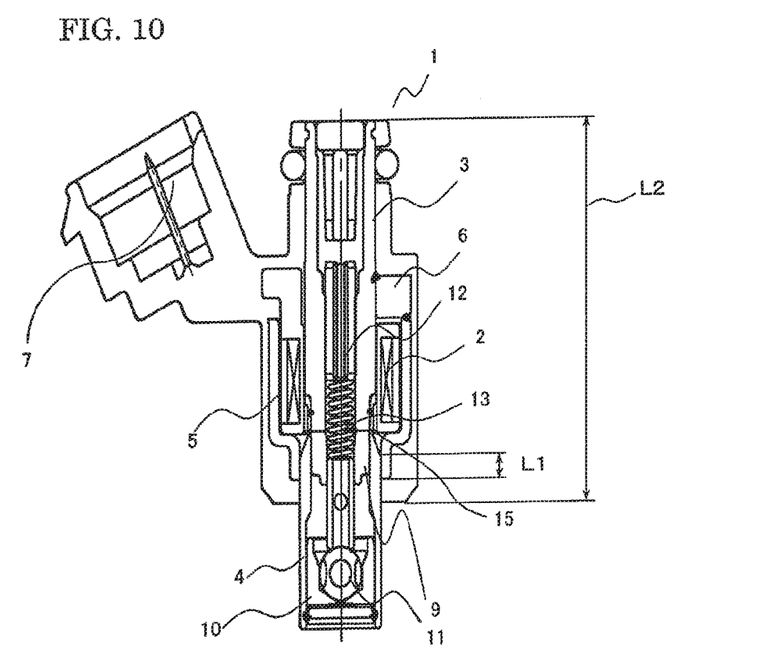
FIG. 10 is a sectional view showing a modified example of FIG. 7.

By the way, in order to solve the problem of the magnetic efficiency, there is conceivable a construction of FIG. 10 in which a thinned portion 15 is provided on a holder 4 by using the construction of FIG. 7 as a base. In FIG. 10, in order to solve the problem of the mounting length L2, a housing 5 is press-fitted onto the holder 4 and fixed to reduce magnetic loss and the facing length L1 of the holder 4 and the housing 5 is shortened to reduce a mounting length L2. However, in the structure of FIG. 10, three components of a cap 6, a core assembly (hereinafter, referred to as "core ASSY") in which a core 3 and the holder 4 are integrated, and the housing 5 are press-fitted at three places, respectively. Thus, if assembly is forcibly performed by a strong press-fit load, there is no place where axial deviation is absorbed; and accordingly, as a result, deformation is generated at a weak strength portion, for example, the holder thinned portion 15. Then, as the thinned portion 15 is deformed, the inner diameter of the holder at a portion where an armature 9 is stored is deformed and it becomes a sliding defect of a valve body serving as a movable element.

The present invention has been made to solve the foregoing conventional problem, and an object of the present invention is to provide a fuel injection. valve in which magnetic efficiency is high, a mounting length is short, and injection performance is good while preventing a sliding defect of a valve body serving as a movable element, Means for Solving the Problems According to the present invention, there is provided a fuel injection valve including: a valve body which is a movable element composed of a valve portion and an armature that is connected to the valve portion and serves as an electromagnetic suction portion of the valve portion, and constitutes a valve mechanism that is driven by magnetic suction force caused by a magnetic field generated by a coil and pressing force of a spring to mount or remove the valve portion on or from a valve seat; a core having a surface magnetically facing the fuel upstream side end surface of the armature; a holder which accommodates the valve body, has a surface magnetically facing the outer periphery of the armature, and is joined to the core; a housing which is press-fitted onto the outer periphery of the holder, and accommodates the coil; and a cap which covers the fuel upstream side of the coil in a lid shape, and is press-fitted onto the outer periphery of the core, In the fuel injection valve, the lower surface of the cap is brought into contact with the upper end surface of the housing in a radially slidable state and then an outer peripheral portion of a contact surface between the cap and the housing is joined by welding,

Advantageous Effect of the Invention

According to the fuel injection valve of the present invention, since the lower surface of the cap and the upper end surface of the housing are formed into the contact surface to make the two radially slidable, even when the housing is press-fitted onto a core ASSY in which the core and the holder are integrated and axial deviation occurs between the outer diameter of the cap and the outer diameter of the housing in a state where the cap is press-fitted onto the core ASSY, the two are not radially restrained, a stress due to assembly is not exerted on, for example, a thinned portion of the holder and deformation of the holder is prevented. Furthermore, the cap comes into contact with the housing at their surfaces and therefore magnetic connection is secured. As a result, there can be obtained the fuel injection valve in which magnetic efficiency is not reduced, a mounting length is short, and injection performance is good while preventing a sliding defect of the movable element.

The foregoing and other objects, features, and advantageous effects of the present invention will become more apparent from detailed description in the following embodiments and description in the accompanying drawings.

BRIEF DESCRIPTION OF THE DRAWINGS

FIG. 5 is a sectional view of the sub-assembly shown in. FIG. 4;

MODE FOR CARRYING OUT THE INVENTION

Hereinafter, embodiments of the present invention will be described with reference to drawings. Incidentally, the same reference numerals and letters as those shown in the respective drawings represent identical or corresponding portions.
Embodiment 1.

Figure 1:
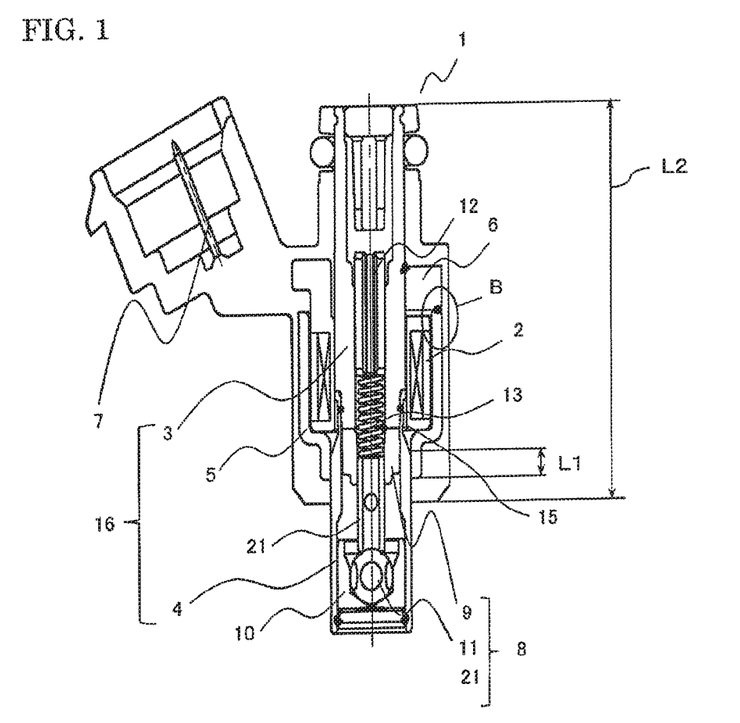
FIG. 1 is a sectional view showing the configuration of a fuel injection valve according to Embodiment 1 of the present invention.
Figure 2:
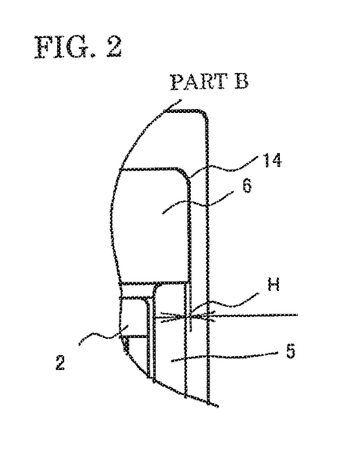
FIG. 2 is an enlarged view of a part B of FIG. 1 and shows a difference in level of a joint surface between a cap and a housing before welding.
Figure 3:
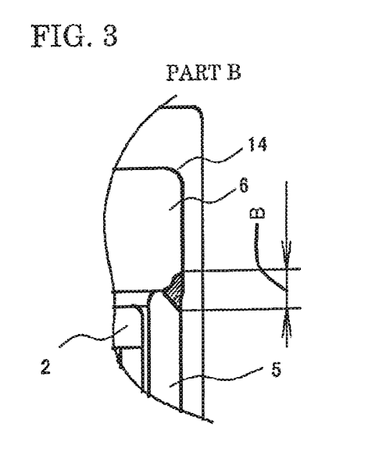
FIG. 3 is an enlarged view of the part B of FIG. 1 and shows a joint portion between the cap and the housing after welding.

FIG. 1 is a sectional view showing the configuration of a fuel injection valve according to Embodiment 1 of the present invention; FIG. 2 is an enlarged view of a part B of FIG. 1 and shows a difference in level of a joint surface between a cap and a housing before welding; and FIG. 3 is an enlarged view of the part B of FIG. 1 and shows a joint portion between the cap and the housing after welding.

In FIG. 1, a solenoid portion of a fuel injection valve 1 includes: an electrode terminal 7 which comes into contact with an external terminal and is energized; a coil 2 which is connected to the electrode terminal 7 and generates magnetism by the energization; a core 3 serving as a fixed core; an armature 9 which has a surface magnetically facing the lower surface of the core 3 and serves as a suction portion of a valve body 8; a holder 4 having a surface magnetically facing the lateral surface of the armature 9; a housing 5 which is press-fitted onto the outer periphery of the holder and accommodates the coil 2; and a cap 6 which is arranged on an upper part of the inside of the housing 5 and is press-fitted onto the outer periphery of the core 3. Incidentally, the valve body 8 is similar to those conventionally well-known and is composed of the armature 9, a valve portion 11, and a pipe 21. The valve body 8 is configured such that when the valve is closed, the valve body 8 is pressed to a valve seat 10 by a spring 13; and if the electrode terminal 7 is energized, a magnetic field generated by the coil 2 generates magnetic suction force that suctions the armature 9 to the core 3 side, whereby the valve body 8 moves to the core 3 side and a gap is generated between the valve portion 11 and the valve seat 10, that is, the valve is opened and fuel flows.

A downstream side outer peripheral portion of the core 3 is press-fitted into an upstream side inner peripheral portion of the holder 4 and then welded to the holder 4 to seal internal fuel; and the core 3 and the holder 4 are integrated as a core ASSY 16. In the core ASSY 16, the core 3 and the holder 4 are magnetically connected via a thinned portion 15 of the holder 4 to minimize magnetic leakage.

The housing 5 is manufactured in a two-step hollow cylindrical shape by drawing.

In assembly of the solenoid, first, an inner peripheral portion on the downstream side of the housing 5 is press-fitted onto an outer peripheral portion of the holder 4 of the core ASSY 16 to be magnetically connected. Magnetic loss is solved by press-fitting of the outer peripheral portion of the holder 4 into the inner peripheral portion of the housing 5, and the press-fit length L1 of the holder 4 and the housing 5 is a short length of about 0.5 to 2 times of the plate thickness of the housing 5 and a magnetic path is secured.

Next, the coil 2 is stored in the housing 5, and then the cap 6 is positioned by bringing the lower surface of the cap 6 into contact with the upper end surface of the housing 5 while being press-fitted onto the outer periphery of the core 3. A cutout serving as an outlet of the electrode terminal 7 is set in the cap 6; and the cap 6 is press-fitted onto the outer periphery of the core 3 without interfering with the electrode terminal 7. (See FIG. 4 to be described later.)

After that, the exterior of the solenoid is molded and then the valve body 8 composed of the armature 9, the valve portion 11, and the pipe 21 is stored in the inside of the holder 4; and the spring 13 that is made into a compressed state by a rod 12 fixed in the inside of the core 3 comes into contact with the upper end of the pipe 21 of the valve body 8 to exert a predetermined load on the valve body 8 in. the downstream direction, thereby creating a state where the valve portion 11 is pressed to the valve seat 10 accommodated in the holder 4.

Incidentally, such an operation of the fuel injection valve itself is similar to those well-known in the art and therefore detailed description will be omitted.

Here, in the fuel injection valve of Embodiment 1, the lower surface of the cap 6 and the upper end surface of the housing 5 are in a contact state of the flat surfaces and the two are in a radially slidable state. Therefore, even when the outer periphery of the cap 6 and the outer periphery of the housing 5 are in an axial deviation state when the cap 6 is assembled, the assembly performed without exerting a stress on a low strength portion such as the holder thinned portion 15 and magnetic connection is secured by the contact of the flat surfaces. Therefore, good injection performance of the fuel injection valve can be secured without reducing magnetic efficiency while preventing a sliding defect of the valve body.

Furthermore, the cap 6 provided with the cutout serving as the outlet of the electrode terminal 7 is manufactured by stamping; and as shown in the enlarged view of FIG. 2, the surface side, at which there is not a droop 14 of an outer peripheral corner portion, of the press stamped lower side surface serves as a contact surface with the housing 5. Therefore, the cap 6 can be manufactured with more inexpensive processing cost as compared to that of cutting; and a contact area between the lower surface of the cap and the upper end surface of the housing, that is, u magnetic path area is stably secured and a variation in performance of the fuel injection valve can be reduced.

Moreover, as shown in the enlarged view of FIG. 3, the cap 6 is press-fitted onto the core 3 to become a contact state with the upper surface of the housing 5 and then laser is irradiated on the outer peripheral interface between the cap 6 and the housing 5 to melt the two for joining. At this time, as shown in FIG. 2, even when there is a radial difference in level H between the outer peripheries of the cap 6 and the housing 5, the difference in level between the two outer diameters is smoothed to become a continuous shape by the melting of the joint portion, a variation of the contact area between the lower surface of the cap and the upper end surface of the housing is alleviated, the magnetic path area stably secured, and the variation in performance of the fuel injection valve can be reduced, In addition, in the fuel injection valve of Embodiment 1, the outer diameter of the cap 6 made larger with respect to the outer diameter of the housing 5 than the amount of eccentricity between the two. Thus, as shown in FIG. 2, it always become a state where the outer diameter of the cap 6 is projected to the outer diameter side than the outer diameter of the housing 5, and the upper end surface of the housing 5 certainly comes into contact with the lower surface of the cap 6 on the entire surface. Therefore, the contact area between the cap 6 and the housing 5 does not depend on the amount of axial deviation between the two, but is determined by only an area of the upper end surface of the housing; the contact area, that is, the magnetic path area is stably secured; and the variation in performance of the fuel injection valve can be reduced, By the way, as shown in FIG. 2, the difference in level H caused by the axial deviation is generated on an outer peripheral portion when the cap 6 butts against the housing 5. At this time, the size of the difference in level H is determined by tolerance of each component and it takes costs to reduce the tolerance. Thus, it is preferable to reduce costs by setting the tolerance, that is, the difference in level H to be large as much as possible within a range in which a welding defect is not generated.

Figure 6:
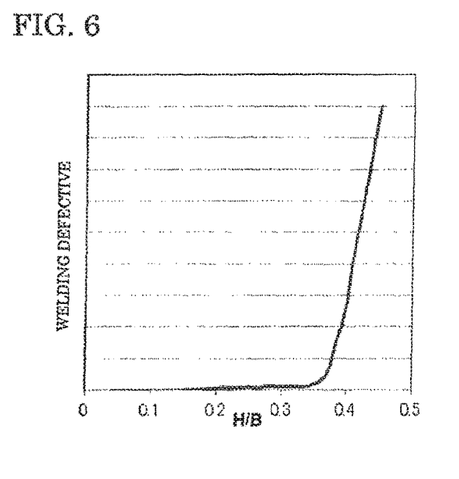
FIG. 6 is a correlation view showing the relationship between a rate of a difference in level H between the cap and the housing to a welding width B and a welding defective rate in Embodiment 1 of the present invention.

From such a viewpoint, as a result of experimentally confirming the relationship between a rate (namely, H/B) of the difference in level H to a welding width B (see FIG. 3) and a welding defective rate, a relationship shown in FIG. 6 is confirmed.

Therefore, a reduction in component cost can be achieved without generating the welding defect by setting the tolerance of each component so that the relationship between the difference in level H and the welding width B satisfies H≤B/3, that is, the difference in level H is equal to or lower than ⅓ of the welding width when the cap 6 butts against the housing 5. Furthermore, if process capability of the difference in level H becomes definite, management of welding strength can be performed by only the welding width B that is easy for measurement and therefore it also becomes excellent in cost performance in the aspect of manufacturing.

Figure 4:
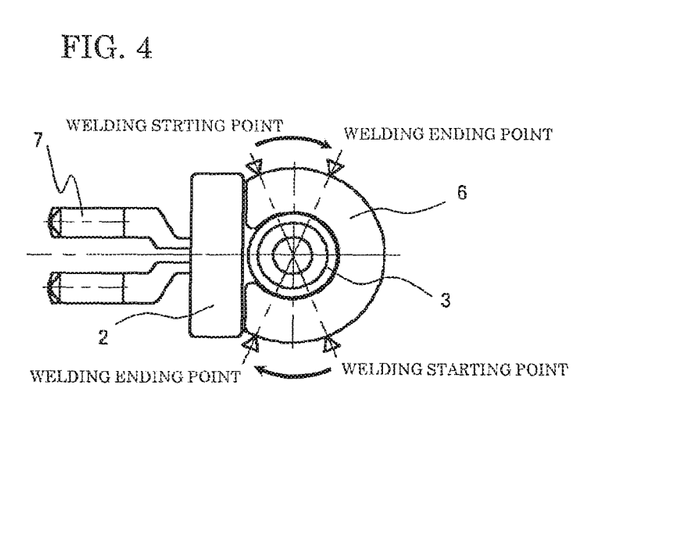
FIG. 4 is top view of a sub-assembly for explaining a method of welding the cap and the housing in the fuel injection valve of Embodiment 1 of the present invention.
Figure 5:
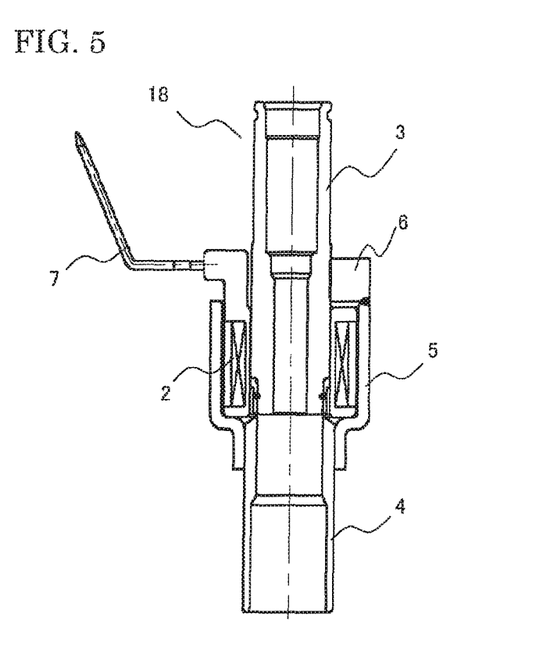

FIG. 4 is a top view and FIG. 5 is a sectional view, each of which shows a sub-assembly 18 for explaining a welding process of the cap 6 and the housing 5 in Embodiment 1. In the case of welding the outer peripheral portion of the cap 6 and the housing 5, if the welding is performed from one direction, the difference in level H may be changed in a welding place on the opposite side by the influence of thermal contraction due to the welding. More specifically, at the time when the cap 6 is press-fitted onto the core 3 to butt against the housing 5, even when the difference in level H is a good weldable range, the difference in level H on the opposite side of a welding portion becomes large and the welding defect is likely to be generated when one side is welded. So, in Embodiment 1, as shown in FIG. 4, laser welding is performed at the same time in two directions opposed by 180 degrees. As described above, by performing the laser welding, a change of the difference in level H due to the thermal contraction can be suppressed and the welding defect can be considerably reduced.

INDUSTRIAL APPLICABILITY

The present invention is suitable as a fuel injection valve of a small displacement two-wheeled vehicle.

DESCRIPTION OF REFERENCE NUMERALS

1 Fuel injection valve, 2 Coil, 3 Core,
4 Holder, 5 Housing, 6 Cap,
7 Electrode terminal,
8 Valve body (movable element), 9 Armature,
10 Valve seat, 11 Valve portion, 12 Rod,
13 Spring, 15 Thinned portion,
16 Core ASSY (core assembly),
18 Sub-assembly, 21 Pipe.

The invention claimed is:

1. A fuel injection valve comprising:
    a valve body which is a movable element composed of a valve portion and an armature that is connected to said valve portion and serves as an electromagnetic suction portion of said valve portion, and constitutes a valve mechanism that is driven by magnetic suction force caused by a magnetic field generated by a coil and pressing force of a spring to mount or remove said valve portion on or from a valve seat;
    a core having a surface magnetically facing the fuel upstream side end surface of said armature;
    a holder which accommodates said valve body, has a surface magnetically facing the outer periphery of said armature, and is joined to said core;
    a housing which is press-fitted onto the outer periphery of said holder, and accommodates said coil; and
    a cap which covers the fuel upstream side of said coil in a lid shape, and is press-fitted onto the outer periphery of said core,
    wherein the lower surface of said cap is brought into contact with the upper end surface of said housing in a radially slidable state and then an outer peripheral portion of a contact surface between said cap and said housing is joined by welding, wherein the outer diameter of said cap is made larger with respect to the outer diameter of said housing than the amount of radial eccentricity of said cap and said housing.

2. The fuel injection valve according to claim 1, wherein said cap is manufactured by stamping; and said cap is configured such that said cap is provided with a cutout serving as an outlet of an electrode terminal and the press stamped lower side surface of said cap is brought into contact with said housing.

3. The fuel injection valve according to claim 2, wherein the outer peripheral portion of the contact surface between said cap and said housing is welded by laser welding.

4. The fuel injection valve according to claim 1, wherein dimension of each component of said fuel injection valve is set to have tolerance so that a welding width B between said housing and said cap and a difference in level H of the outer peripheral portion of said housing and said cap become the following equation (1), the difference in level H being generated by axial deviation $$H \leq B/3 \tag{1}.$$

5. The fuel injection valve according to claim 4, wherein the outer peripheral portion of the contact surface between said cap and said housing is welded by laser welding.

6. The fuel injection valve according to claim 1, wherein the outer peripheral portion of the contact surface between said cap and said housing is welded by laser welding.

7. The fuel injection valve according to claim 1, wherein the core and the holder are magnetically connected by a thinned portion of the holder.

8. A fuel injection valve comprising:

a valve body which is a movable element composed of a valve portion and an armature that is connected to said valve portion and serves as an electromagnetic suction portion of said valve portion, and constitutes a valve mechanism that is driven by magnetic suction force caused by a magnetic field generated by a coil and pressing force of a spring to mount or remove said valve portion on or from a valve seat;

a core having a surface magnetically facing the fuel upstream side end surface of said armature;

a holder which accommodates said valve body, has a surface magnetically facing the outer periphery of said armature, and is joined to said core;

a housing which is press-fitted onto the outer periphery of said holder, and accommodates said coil; and a cap which covers the fuel upstream side of said coil in a lid shape, and is press-fitted onto the outer periphery of said core, wherein the lower surface of said cap is brought into contact with the upper end surface of said housing in a radially slidable state and then an outer peripheral portion of a contact surface between said cap and said housing is joined by welding, wherein the core and the holder are magnetically connected by a thinned portion of the holder.

\* \* \* \* \*